(12) United States Patent
Anderson et al.

(10) Patent No.: US 8,194,262 B2
(45) Date of Patent: Jun. 5, 2012

(54) SYSTEM FOR MASKING PRINT DEFECTS

(75) Inventors: David G. Anderson, Ontario, NY (US); Peter Paul, Webster, NY (US)

(73) Assignee: Xerox Corporation, Norwalk, CT (US)

(*) Notice: Subject to any disclaimer, the term of this patent is extended or adjusted under 35 U.S.C. 154(b) by 1017 days.

(21) Appl. No.: 11/363,378

(22) Filed: Feb. 27, 2006

(65) Prior Publication Data

US 2007/0201097 A1   Aug. 30, 2007

(51) Int. Cl.
*G06K 15/00* (2006.01)
*H04N 1/407* (2006.01)

(52) U.S. Cl. ........................ 358/1.14; 358/3.26
(58) Field of Classification Search ............ 358/1.1, 358/1.9, 1.11–1.18
See application file for complete search history.

(56) References Cited

U.S. PATENT DOCUMENTS

| | | | |
|---|---|---|---|
| 4,579,446 A | 4/1986 | Fujino et al. | |
| 4,587,532 A | 5/1986 | Asano | |
| 4,836,119 A | 6/1989 | Siraco et al. | |
| 5,004,222 A | 4/1991 | Dobashi | |
| 5,080,340 A | 1/1992 | Hacknauer et al. | |
| 5,095,342 A | 3/1992 | Farrell et al. | |
| 5,159,395 A | 10/1992 | Farrell et al. | |
| 5,208,640 A | 5/1993 | Horie et al. | |
| 5,272,511 A | 12/1993 | Conrad et al. | |
| 5,326,093 A | 7/1994 | Sollitt | |
| 5,435,544 A | 7/1995 | Mandel | |
| 5,473,419 A | 12/1995 | Russel et al. | |
| 5,489,969 A | 2/1996 | Soler et al. | |
| 5,504,568 A | 4/1996 | Saraswat et al. | |
| 5,525,031 A | 6/1996 | Fox | |
| 5,557,367 A | 9/1996 | Yang et al. | |
| 5,568,246 A | 10/1996 | Keller et al. | |
| 5,570,172 A | 10/1996 | Acquaviva | |
| 5,596,416 A | 1/1997 | Barry et al. | |
| 5,629,762 A | 5/1997 | Mahoney et al. | |
| 5,710,968 A | 1/1998 | Clark et al. | |
| 5,778,377 A | 7/1998 | Marlin et al. | |
| 5,884,910 A | 3/1999 | Mandel | |
| 5,995,721 A | 11/1999 | Rourke et al. | |
| 6,059,284 A | 5/2000 | Wolf et al. | |
| 6,125,248 A | 9/2000 | Moser | |
| 6,141,121 A * | 10/2000 | Chen et al. | 358/534 |
| 6,241,242 B1 | 6/2001 | Munro | |
| 6,297,886 B1 | 10/2001 | Cornell | |
| 6,341,773 B1 | 1/2002 | Aprato et al. | |
| 6,384,918 B1 | 5/2002 | Hubble, III et al. | |
| 6,450,711 B1 | 9/2002 | Conrow | |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner* — Thierry Pham
(74) *Attorney, Agent, or Firm* — Fay Sharpe LLP

(57) ABSTRACT

A method of printing includes, on an ongoing basis, determining a print defect state of a printing system, selecting a screen which has a halftone print parameter which masks a detected print defect, such as one or more of a screen frequency parameter, a screen angle parameter, and a dot growth parameter. The method further includes printing images according to the selected halftone print parameter. Alternatively, where the printing system includes more than one marking engine, the method includes selecting a marking engine according to the determined defect states of each of the marking engines.

21 Claims, 4 Drawing Sheets

U.S. PATENT DOCUMENTS

| | | |
|---|---|---|
| 6,476,376 B1 | 11/2002 | Biegelsen et al. |
| 6,476,923 B1 | 11/2002 | Cornell |
| 6,493,098 B1 | 12/2002 | Cornell |
| 6,504,625 B1 * | 1/2003 | Amero et al. ............... 358/1.9 |
| 6,537,910 B1 | 3/2003 | Burke et al. |
| 6,550,762 B2 | 4/2003 | Stoll |
| 6,554,276 B2 | 4/2003 | Jackson et al. |
| 6,577,925 B1 | 6/2003 | Fromherz |
| 6,607,320 B2 | 8/2003 | Bobrow et al. |
| 6,608,988 B2 | 8/2003 | Conrow |
| 6,612,566 B2 | 9/2003 | Stoll |
| 6,612,571 B2 | 9/2003 | Rider |
| 6,621,576 B2 | 9/2003 | Tandon et al. |
| 6,633,382 B2 | 10/2003 | Hubble, III et al. |
| 6,639,669 B2 | 10/2003 | Hubble, III et al. |
| 6,819,906 B1 | 11/2004 | Herrmann et al. |
| 6,917,443 B1 | 7/2005 | Wang |
| 6,925,283 B1 | 8/2005 | Mandel et al. |
| 6,959,165 B2 | 10/2005 | Mandel et al. |
| 6,973,286 B2 | 12/2005 | Mandel et al. |
| 7,085,014 B2 * | 8/2006 | Condon et al. ............... 358/3.06 |
| 2002/0078012 A1 | 6/2002 | Ryan et al. |
| 2002/0103559 A1 | 8/2002 | Gartstein |
| 2003/0077095 A1 | 4/2003 | Conrow |
| 2003/0142985 A1 * | 7/2003 | Sampath et al. ............... 399/9 |
| 2004/0051907 A1 * | 3/2004 | Huang et al. ............... 358/3.06 |
| 2004/0085561 A1 | 5/2004 | Fromherz |
| 2004/0085562 A1 | 5/2004 | Fromherz |
| 2004/0088207 A1 | 5/2004 | Fromherz |
| 2004/0150156 A1 | 8/2004 | Fromherz et al. |
| 2004/0150158 A1 | 8/2004 | Biegelsen et al. |
| 2004/0153983 A1 | 8/2004 | McMillan |
| 2004/0216002 A1 | 10/2004 | Fromherz et al. |
| 2004/0225391 A1 | 11/2004 | Fromherz et al. |
| 2004/0225394 A1 | 11/2004 | Fromherz et al. |
| 2004/0247365 A1 | 12/2004 | Lofthus et al. |
| 2005/0190408 A1 * | 9/2005 | Vittitoe ............... 358/3.06 |
| 2005/0275855 A1 * | 12/2005 | Mizes et al. ............... 358/1.9 |
| 2007/0046705 A1 * | 3/2007 | Wong et al. ............... 347/14 |

OTHER PUBLICATIONS

Desmond Fretz, "Cluster Printing Solution Announced", Today at Xerox (TAX), No. 1129, Aug. 3, 2001.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/917,768, filed Aug. 13, 2004, Lofthus et al.
U.S. Appl. No. 10/924,106, filed Aug. 23, 2004, Lofthus et al.
U.S. Appl. No. 10/924,113, filed Aug. 23, 2004, deJong et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,326, filed Nov. 30, 2004, Grace et al.
U.S. Appl. No. 10/999,450, filed Nov. 30, 2004, Lofthus et al.
U.S. Appl. No. 11/000,158, filed Nov. 30, 2004, Roof.
U.S. Appl. No. 11/000,168, filed Nov. 30, 2004, Biegelsen et al.
U.S. Appl. No. 11/000,258, filed Nov. 30, 2004, Roof.
U.S. Appl. No. 11/051,817, filed Feb. 4, 2005, Moore et al.
U.S. Appl. No. 11/070,681, filed Mar. 2, 2005, Viturro et al.
U.S. Appl. No. 11/081,473, filed Mar. 16, 2005, Moore.
U.S. Appl. No. 11/069,020, filed Feb. 28, 2005, Lofthug et al.
U.S. Appl. No. 11/089,854, filed Mar. 25, 2005, Clark et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore et al.
U.S. Appl. No. 11/094,998, filed Mar. 31, 2005, Moore et al.
U.S. Appl. No. 11/094,864, filed Mar. 31, 2005, de Jong et al.
U.S. Appl. No. 11/095,872, filed Mar. 31, 2005, Julien et al.
U.S. Appl. No. 11/102,355, filed Apr. 8, 2005, Fromherz et al.
U.S. Appl. No. 11/084,280, filed Mar. 18, 2005, Mizes.
U.S. Appl. No. 11/109,566, filed Apr. 19, 2005, Mandel et al.
U.S. Appl. No. 11/109,558, filed Apr. 19, 2005, Furst et al.
U.S. Appl. No. 11/109,996, filed Apr. 20, 2005, Mongeon et al.
U.S. Appl. No. 11/093,229, filed Mar. 29, 2005, Julien.
U.S. Appl. No. 11/102,899, filed Apr. 8, 2005, Crawford et al.
U.S. Appl. No. 11/102,910, filed Apr. 8, 2005, Crawford et al.
U.S. Appl. No. 11/115,766, filed Apr. 27, 2005, Grace.
U.S. Appl. No. 11/102,332, filed Apr. 8, 2005, Hindi et al.
U.S. Appl. No. 11/136,959, filed May 25, 2005, German et al.
U.S. Appl. No. 11/122,420, filed May 5, 2005, Richards.
U.S. Appl. No. 11/137,634, filed May 25, 2005, Lofthus et al.
U.S. Appl. No. 11/137,251, filed May 25, 2005, Lofthus et al.
U.S. Appl. No. 11/137,273, filed May 25, 2005, Anderson et al.
U.S. Appl. No. 11/152,275, filed Jun. 14, 2005, Roof et al.
U.S. Appl. No. 11/156,778, filed Jun. 20, 2005, Swift.
U.S. Appl. No. 11/157,598, filed Jun. 21, 2005, Frankel.
U.S. Appl. No. 11/143,818, filed Jun. 2, 2005, Dalal et al.
U.S. Appl. No. 11/146,665, filed Jun. 7, 2005, Mongeon.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/170,873, filed Jun. 30, 2005, Klassen.
U.S. Appl. No. 11/170,975, filed Jun. 30, 2005, Klassen.
U.S. Appl. No. 11/170,845, filed Jun. 30, 2005, Sampath et al.
U.S. Appl. No. 11/189,371, filed Jul. 26, 2005, Moore et al.
U.S. Appl. No. 11/212,367, filed Aug. 26, 2005, Anderson et al.
U.S. Appl. No. 11/208,871, filed Aug. 22, 2005, Dalal et al.
U.S. Appl. No. 11/215,791, filed Aug. 30, 2005, Hamby et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/222,260, filed Sep. 8, 2005, Goodman et al.
U.S. Appl. No. 11/235,979, filed Sep. 27, 2005, Anderson et al.
U.S. Appl. No. 11/247,778, filed Oct. 11, 2005, Radulski et al.
U.S. Appl. No. 11/248,044, filed Oct. 12, 2005, Spencer et al.
U.S. Appl. No. 11/236,099, filed Sep. 27, 2005, Anderson et at.
U.S. Appl. No. 11/287,177, filed Nov. 23, 2005, Mandel et al.
U.S. Appl. No. 11/291,583, filed Nov. 30, 2005, Lang.
U.S. Appl. No. 11/291,860, filed Nov. 30, 2005, Willis.
U.S. Appl. No. 11/274,638, filed Nov. 15, 2005, Wu et al.
U.S. Appl. No. 11/287,685, filed Nov. 28, 2005, Carolan.
U.S. Appl. No. 11/317,589, filed Dec. 23, 2005, Biegelsen et al.
U.S. Appl. No. 11/314,774, filed Dec. 21, 2005, Klassen.
U.S. Appl. No. 11/317,167, filed Dec. 23, 2005, Lofthus et al.
U.S. Appl. No. 11/314,828, field Dec. 21, 2005, Anderson et al.
U.S. Appl. No. 11/292,388, filed Nov. 30, 2005, Mueller.
U.S. Appl. No. 11/292,163, filed Nov. 30, 2005, Mandel et al.
U.S. Appl. No. 11/312,081, filed Dec. 20, 2005, Mandel et al.
U.S. Appl. No. 11/331,627, filed Jan. 13, 2006, Moore.

\* cited by examiner

SYSTEM FOR MASKING PRINT DEFECTS

CROSS REFERENCE TO RELATED PATENTS AND APPLICATIONS

The following applications, the disclosures of which are totally incorporated herein by reference, are mentioned:

U.S. patent application Ser. No. 10/922,316, entitled METHOD AND SYSTEMS ACHIEVING PRINT UNIFORMITY USING REDUCED MEMORY OR COMPUTATIONAL REQUIREMENTS, filed Aug. 19, 2004, by Zhang, et al.;

U.S. application Ser. No. 11/143,818 entitled INTER-SEPARATION DECORRELATOR, filed Jun. 2, 2005, by Dalal, et al.;

U.S. application Ser. No. 10/923,166, entitled UNIFORMITY COMPENSATION IN HALFTONED IMAGES, filed Aug. 20, 2004, by Zhang, et al.;

U.S. application Ser. No. 10/999,326, filed Nov. 30, 2004, entitled SEMI-AUTOMATIC IMAGE QUALITY ADJUSTMENT FOR MULTIPLE MARKING ENGINE SYSTEMS, by Robert E. Grace, et al.;

U.S. application Ser. No. 11/070,681, filed Mar. 2, 2005, entitled GRAY BALANCE FOR A PRINTING SYSTEM OF MULTIPLE MARKING ENGINES, by R. Enrique Viturro, et al.; and U.S. application Ser. No. 11/137,251, filed May 25, 2005, entitled SCHEDULING SYSTEM, by Robert M. Lofthus, et al.

BACKGROUND

The exemplary embodiment relates to printing systems and to methods of printing. It finds particular application in conjunction with a system for reducing non-uniformity of printed images, and will be described with particular reference thereto.

Image non-uniformity occurs in the output images of digital imaging devices, such as copiers, scanners, and printers, for a variety of reasons. Even relatively small non-uniformities can give rise to visibly objectionable print defects. In printing systems, physical alignments, component tolerances, wear and component age can influence the uniformity with which colorants, such as inks and toners, are laid down across the surface of print media. Streaks, for example, are one-dimensional image defects that generally run parallel to the process direction in the printed image. They can arise from non-uniform responses of the subsystems of a marking engine and can be constant over time in that they appear in relatively the same location from print to print. Photoreceptor scratches, contamination of the charger wire, non-uniform LED imager output and Raster Output Scanner (ROS) spot size variations, and spatially varying pressure on a bias transfer roll are examples of subsystem defects which can give rise to rendered image streaking in a xerographic marking engine. Bands are also one-dimensional image defects that generally run perpendicular to the process direction in a printed image. They are typically caused by time-varying performance of a marking engine subsystem, such as non-uniform velocity of the photoreceptor drive, out-of-roundness of development rolls, and wobble of the ROS polygon mirror. In a uniform patch of gray, streaks and bands may appear as a variation in the gray level. In general, "gray" refers to the optical density or area coverage value of any single color separation layer, whether the colorant is black, cyan, magenta, yellow, or some other color. Other defects which may arise include and mottle and graininess. Both of these are two dimensional variations in gray level, which take the appearance of dots or small irregular shapes. Graininess is similar to mottle but the variations are smaller in size.

Imaging devices generally include a processing component which converts color input values for an image into corresponding output values for each of the colorants to be used in rendering the image. For color images, bitmaps, each forming a color separation, are combined. Each color separation may be defined by a number of gray levels. The multiple color separations are combined together at printing to yield the final color print. Commonly, color documents are formed using cyan, magenta, and yellow colorants or cyan, magenta, yellow, and black colorants. A larger number or alternative colorants may also be used.

In half-tone printing, each color separation is represented by dots. Each dot can be made up of a number of pixels or elements, usually arranged in a grid, which are binary in the sense they can be either fully on or fully off. Part of the processing of input digital images, in which pixels may be defined on a continuous tone image, includes determining which pixels of each dot of the image should be on and which off. Typically, a mask is used which specifies for each gray level, which pixels of the dot are on and which are off. As more pixels are turned on, the size of the dot increases and its apparent gray level to the eye increases.

One-dimensional Tone Reproduction Curves (TRCs) are widely used in digital imaging as a means for compensating for non-linearities introduced by an individual imaging device. Some success has been achieved in the spatial uniformity correction of monochrome images for banding and streaking by appropriate modification to the tone reproduction curve. In the case of streaking, for example, the TRC is modified as a function of position in the cross-process direction. However, the computational cost of such correction methods is high, particularly in the case of color images.

INCORPORATION BY REFERENCE

U.S. Pat. No. 6,760,056 to Klassen, et al., entitled MACRO UNIFORMITY CORRECTION FOR X-Y SEPARABLE NON-UNIFORMITY, the disclosure of which is incorporated herein in its entirety, by reference, discloses a method for compensating for streaks by introducing a separate tone reproduction curve for each pixel column in the process direction. A compensation pattern is printed and then scanned to first measure the ideal tone reproduction curve and then detect and measure streaks. The tone reproduction curves for the pixel columns associated with the streak are then modified to compensate for the streak.

BRIEF DESCRIPTION

Aspects of the exemplary embodiment relate to a printing system and to methods of printing.

In one aspect, a method of printing includes determining a print defect state of a printing system. Where the print defect state includes a print defect, the method includes selecting, from a plurality of screens, a screen with a halftone print parameter which masks the print defect. Images are printed according to the selected screen.

In another aspect, a printing system includes a control system which determines a print defect state of the printing system and selects a screen, from a plurality of available screens, with a halftone print parameter which masks the print defect. A marking engine renders images on print media, the marking engine rendering the images according to the selected screen. In another aspect, a method of printing includes determining a print defect state of each of a plurality of marking engines of a printing system, selecting a marking engine for printing an image based on the determined print defect states, and printing the images on the selected marking engine.

DETAILED DESCRIPTION

Figure 1:
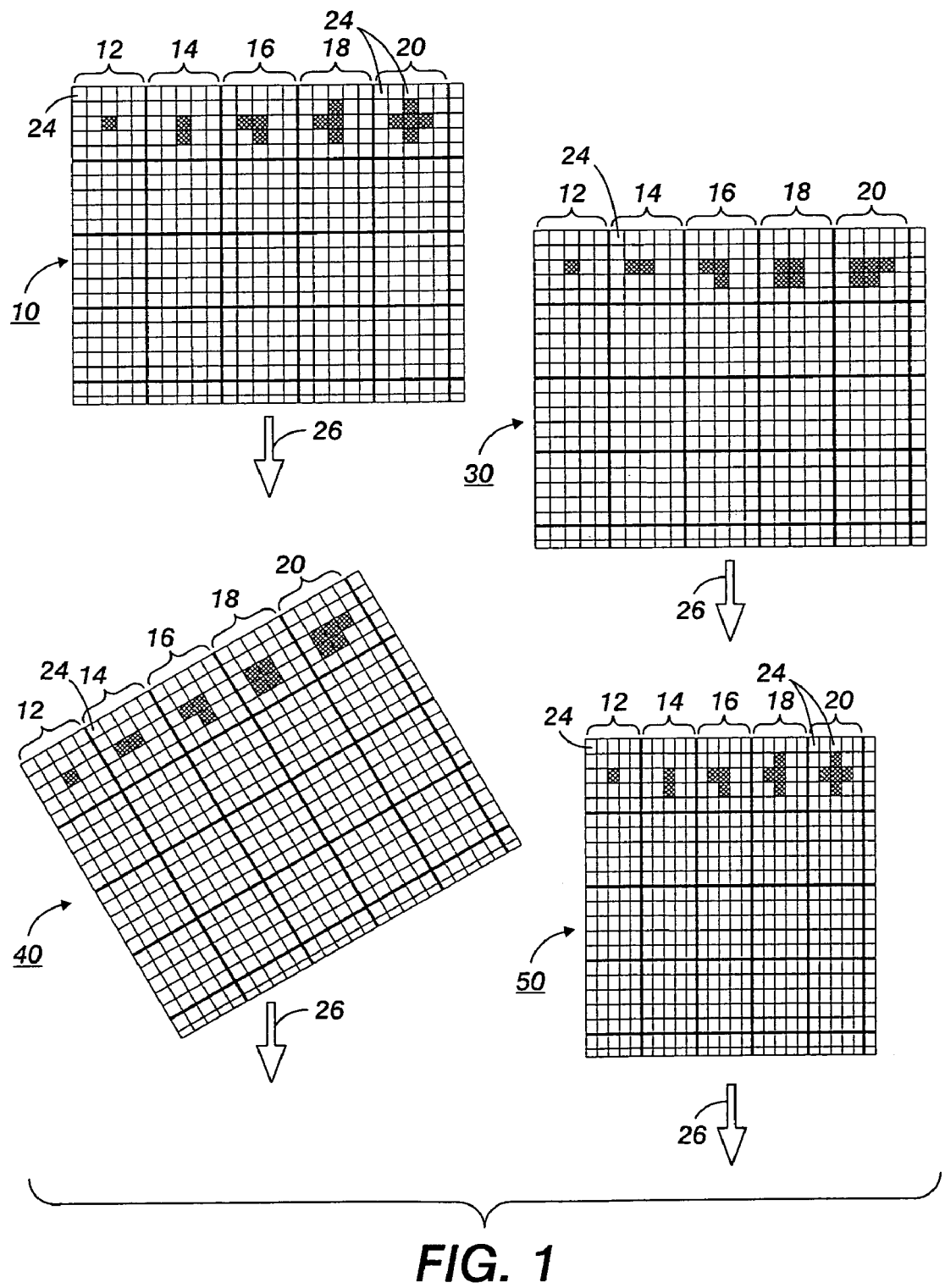
FIG. 1 illustrates four alternate halftone screens for a printing system according to a first exemplary embodiment.

The exemplary embodiment relates to a system and a method for reducing print non-uniformity in printed images which give rise to visibly objectionable print defects in the image.

In one aspect, a method of printing includes determining a defect state of a printing system, selecting a screen with a halftone print parameter which masks the defect, and printing images according to the selected halftone print parameter.

In another aspect, a method includes determining a defect state of a printing system and selecting a marking engine from a plurality of marking engines which masks the defect, and printing images on that marking engine.

In another aspect, a printing system includes at least one marking engine, which renders images on print media, and a sensor which senses print defects on printed media. A control system is configured for receiving print defect data from the sensor and selecting a screen with one or more halftone print parameter for masking the print defect, and/or an appropriate marking engine.

It has been found that each marking engine, as it operates, traverses through a set of defect states or operating conditions that define the current set of print defects that occur on prints produced by the marking engine. The defect state of a marking engine thus changes over time. Thus, even though preselected halftone print parameters may have been set at the factory to provide optimal print quality, over time, the preselected parameters may no longer provide an optimal solution.

Halftone screens may be defined by a set of parameters, e.g., screen frequency, screen angle, and dot growth parameters. For each marking engine defect state, a particular halftone screen will mask or accentuate different print defects to different levels. In accordance with one aspect of the exemplary embodiment, print defects can be masked, e.g., minimized, to the point that they are no longer objectionable to the observer, by selection of a screen having appropriate halftone print parameters. In various aspects, a screen with halftone parameters, such as one or more of screen frequency, dot growth, and screen angle, is selected for masking the print defect (e.g., reduce the degree to which a print defect is likely to be objectionable to the typical human observer). In one embodiment, the halftone screen which best masks the current defect state is selected. In one embodiment, the printing system may have a limited number of screens available and the best of those available may be selected. In another embodiment, screens may be generated on-line to provide a combination of halftone screen parameters which best mask the defect.

A "printing system" can include any device for rendering an image on print media, such as a copier, laser printer, bookmaking machine, facsimile machine, or a multifunction machine.

A "marking engine" generally includes components for rendering an image on print media and optionally fixing the image to the print media. A printing system may include one marking engine or a plurality of marking engines which may be interconnected by a common paper path.

"Print media" can be a usually flimsy physical sheet of paper, plastic, or other suitable physical print media substrate for images. A "print job" or "document" is normally a set of related sheets, usually one or more collated copy sets copied from a set of original print job sheets or electronic document page images, from a particular user, or otherwise related. An image generally may include information in electronic form which is to be rendered on the print media by the printing system and may include text, graphics, pictures, and the like. A "finisher" can be any post-printing accessory device, such as a tray or trays, sorter, mailbox, inserter, interposer, folder, stapler, stacker, hole puncher, collater, stitcher, binder, envelope stuffer, postage machine, or the like. The operation of applying images to print media, for example, graphics, text, photographs, etc., is generally referred to herein as printing or marking.

The printing system may be a halftone printing system in which an input image in digital form is converted to a format in which the image can be rendered. The pixels of the original image may be expressed as continuous colors or gray levels, such as 256 gray levels on an 8 bit scale. In half-tone printing, each color separation is represented by dots or lines on a lattice. Each dot is contained within a cell made up of a number of elements or spots, usually arranged in a grid. It should be appreciated that a halftone dot does not necessarily have to be square in shape but can be, for example, a non-orthogonal parallelogram.

The elements of the cell are binary in the sense they can be either fully on or fully off. The most common halftone technique is screening, which compares the required continuous color tone level of each pixel for each color separation of the input image with one of several predetermined threshold levels. Typically, a screen or "mask" is used which specifies for each gray level, which elements of the dot are on and which are off. As more elements are turned on, the size of the dot increases and its apparent gray level to the eye increases. The predetermined threshold levels are stored in a halftone cell, which is spatially replicated and tiled to form a halftone screen that is the size of a given image. If the required color tone level is darker than the threshold halftone level, a color spot is printed in the specified element. Otherwise the color spot is not printed.

The printing system may have a print defect state which can vary over time, such as the course of a day or more slowly, over weeks or months. In any defect state, the printing system may exhibit one or more print defects or no print defects. The print defects which may be present include one or more of streaking (narrow variations in the gray level of a print in the cross machine direction), banding (variations in the gray level of a print in the machine direction), and mottle or graininess of an image. While banding is generally periodic, the others can be more random. Defects of this type typically show up in images which include large area of a fairly constant gray level, such as a blue sky.

The exemplary printing system has at least one, and in some embodiments, a plurality of selectable screens with different halftone print parameters. The halftone print parameters may include one or more of halftone screen frequency, halftone screen angle, and dot growth parameters. In general, for any print defect, the parameters may each have a different susceptibility to the print defect. Thus, a print defect may be more noticeable, to a human observer, at some values of the parameter, and less noticeable at other values. By selecting a value which masks the defect, the defect is less noticeable to the human eye. In some instances, the selected value of a parameter may be a compromise between image quality and reducing defects. In such cases, the printing system may place a constraint on the range of selectable values of the parameter.

Where more than one type of print defect is present (such as both banding and streaking), the screen parameters may be selected to mask one or both defects. Some print defects are more noticeable to the eye than others. Thus, where more than one type of defect is present, the selection of the screen and/or parameters may be weighted more towards masking the more noticeable defect.

By way of example, in a two-dimensional clustered dot screen, where the dot can grow in two dimensions, the halftone screen frequency can be expressed as the frequency of dots in the screen lattice. In a one-dimensional clustered dot screen (a line screen) each dot is represented by a continuous line, where the spacing of the line defines the frequency and the thickness of line determines the gray level. In this case, the halftone screen frequency refers to the frequency of the lines. As an example, the exemplary printing system may permit a minimum value of the halftone screen frequency of, e.g., 70 dots per inch (dpi) and a maximum halftone screen frequency, e.g., 140 or 200 dpi. Between the minimum and maximum values of the halftone screen frequency there may be one or more additional selectable values. In one embodiment, there may be a screen with a selectable value for each dpi between the maximum and minimum values. In another embodiment, the selectable values of the halftone screen frequency may be regularly spaced, such as for example, by 10 dpi or 50 dpi.

The quality of the image is generally affected by the halftone screen frequency. As the screen frequency increases, the level of detail which may be achieved in the rendered image increases. The optimum screen frequency for image quality may vary depending on the type of image to be rendered (graphics, text, photographs, etc). The printing system may have a screen with a preset screen frequency which is selected (e.g., at the factory, or subsequently) to provide good image quality for all types of images in the absence of any print defects. Or the printing system may have a plurality of preset screens with halftone screen frequencies which are optimized for the particular type of image to be printed, in the absence of print defects.

When a defect is detected, a screen with a halftone screen frequency is selected to mask the defect, which may be the preset halftone screen frequency or a different halftone screen frequency. In general, as the halftone screen frequency increases (higher dpi), the rendered image tends to be more susceptible to visible print defects (banding, streaking, mottle and graininess) than at lower screen frequencies. However, in the case of periodic defects, such as banding, the appearance of the print defect may be worst at the resonant frequency and may also be affected at harmonics of the defect frequency. Thus, in selecting a screen/halftone screen frequency which masks the defect, a screen with a higher or lower screen frequency may be selected than the preset screen frequency.

Since the detail in the image tends to be lost as the screen frequency is reduced, the selected screen frequency may be a compromise between completely masking defects and retaining an acceptable level of detail. In general, the highest halftone screen frequency which will still mask the defect satisfactorily is selected.

The halftone screen angle refers to the angle of the halftone screen lattice to a given direction, such as the process or cross process direction. The printing system may provide a plurality of selectable screens of different screen angles, such as two or three selectable screen angles, one of which may be a preset screen angle. In a color image, employing multiple color separations, each color separation may have its lattice arranged at a different angle. Typically the relationship between the angles of each of the colors is fixed. Thus for example, the preset screen angle for a first color (e.g., black) may be at an angle of $X°$ to the process direction with the angles for second, third, and fourth colors being $(X+30°)$, $(X-30°)$, and $(X+45°)$, respectively. For example, the preset screen angles for black, magenta, cyan, and yellow may be $45°$, $75°$, $15°$, and $90°$, respectively. A second selectable set of screen angles may rotate all of the lattices by $90°$ so that they retain their relationship to one another. Thus in the illustrated embodiment, the screen angles may be $-45°$, $-15°$, $-75°$, and $0°$, for black, magenta, cyan, and yellow, respectively in the second set of selectable screen angles.

In some cases, one or more of the colors may have a different screen design, such as yellow, which is not rotated in relation to the other colors.

The dot growth parameter determines how the dot grows in size. In general the thresholds of a cluster halftone cell are selected such that the dot grows outward from a central dot as the gray level increases (a single-dot halftone cell). However halftone cells which are dual-dot, tri-dot, or quad-dot are also known, which include more than one center from which the dot may grow (i.e., two, three, or four centers, respectively). In the exemplary embodiment, the printing system has a plurality of screens, for a given color separation, in which different threshold levels are set for the elements of a cell. For example the different screens may include two or more of a single-dot, a dual-dot, a tri-dot, and a quad-dot halftone cell. Alternatively, the different screens available for selection by the printing system are all of the same dots per cell (e.g., single-dot) but have different dot growth patterns. The threshold levels for each element may be varied such that the shape of the dot varies. For example, as illustrated in FIG. 1, the printing system may have a first screen 10 comprising a lattice of cells 12, 14, 16, 18, 20, etc, each comprising a plurality of elements 24 arranged in a grid. In the illustrated embodiment, each cell comprises a 5×5 grid, although it will be appreciated that the grid may be larger, such as a 10×10 grid or a 16×16 grid. Each of the elements may be either on or off. In FIG. 1, the lattice is shown as being oriented with the grids aligned with the process direction 26, but it is to be appreciated that the screen may have any other screen angles. The thresholds of the cells of FIG. 1 are selected such that the dot grows generally outward from the center. For example, cells 12, 14, 16, 18, and 20 of the cells of screen 10 may correspond to gray levels of about 10, 20, 30, 40, and 50, respectively, on a 256 bit gray scale. FIG. 1 also shows a second screen 30, where similar elements are accorded the same numerals, in which the dots, for the same gray levels as for screen 10, grow in a different way from the central dot. It is understood in the art that the distribution of printed pixels depends on the design of the halftone cell. A third illustrated screen 40 changes the screen angle parameter and a fourth illustrated screen 50 changes the screen frequency. The thresholds for each element of cell may be stored in an algorithm which decides whether an element is on or off by comparing the input value for the cell with each of the thresholds. Print defects may thus be masked by changing from one screen algorithm to another.

It will be appreciated that there may by a large number of screens with various combinations of parameters which are either stored by the printing system or generated on-line.

While the illustrated clustered dots screens in FIG. 1 are two dimensional clustered dot screens (the dot grows in two dimensions) another type of clustered dot screen which may be employed is a line screen where the lattice is in one dimension each dot represented by a continuous line, where the spacing of the line defines the frequency and the thickness of line determines how a darker or lighter print.

Other screens are also contemplated, such as frequency modulated screens, stochastic screens, and stochlustic screens (combination screens). In one embodiment, the printing system provides two or more screens selected from these types.

Figure 2:
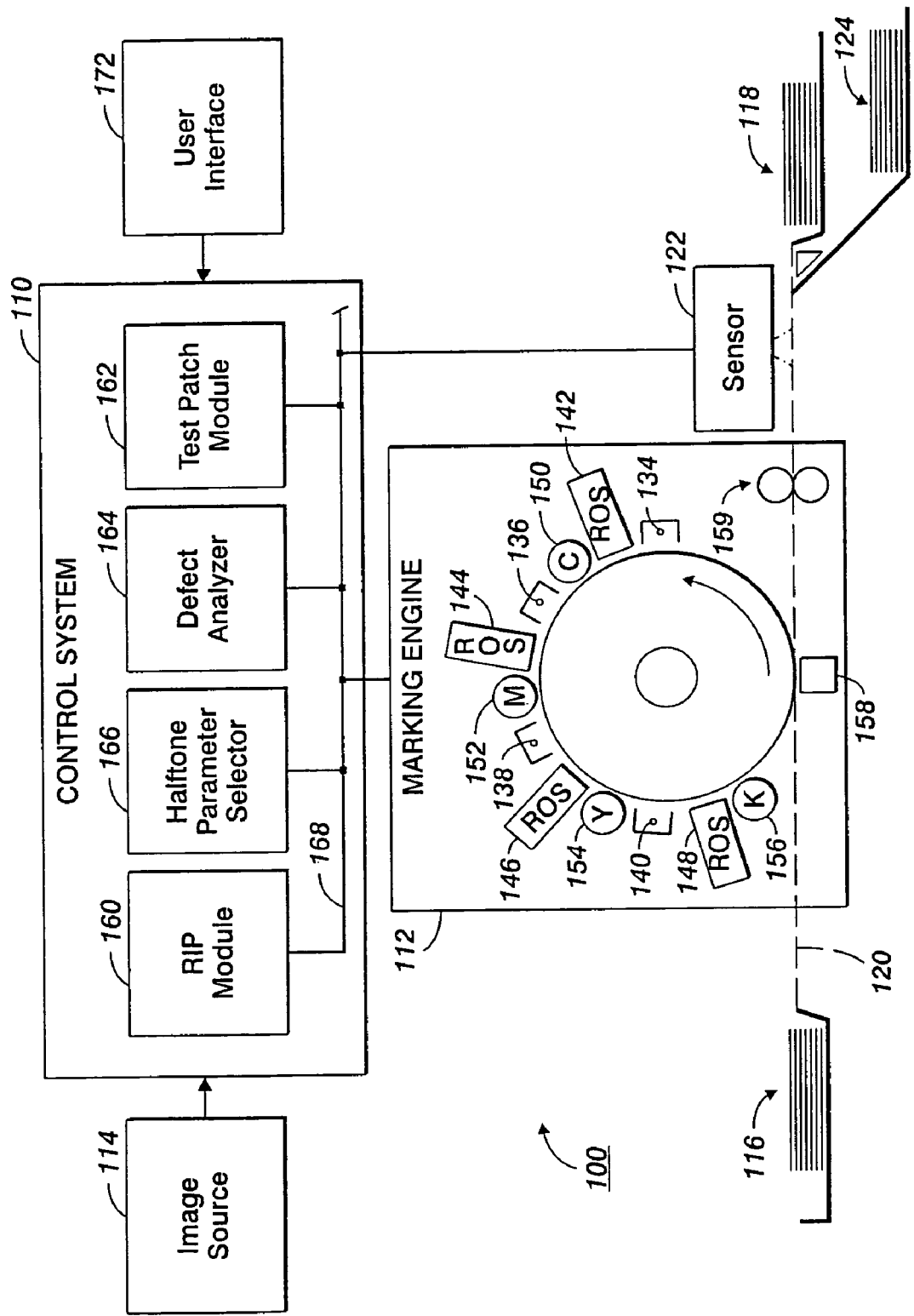
FIG. 2 is a schematic view of a printing system according to one aspect of the exemplary embodiment.

FIG. 2 illustrates an exemplary printing system according to the exemplary embodiment. The illustrated printing system 100 includes a control system 110 and one or more marking engines 112 (only one marking engine is shown in FIG. 2). Digital images to be printed arrive at the printing system from an image source 114, such as a computer workstation, computer network, digital scanner, or the like, over a wired or wireless link. The illustrated marking engine 112 employs xerographic printing technology, in which an electrostatic image is formed and coated with a toner material, and then transferred and fused to paper or another print medium by application of heat and pressure. However, marking engines employing other printing technologies can be provided, such as marking engines employing aqueous ink jet printing, solid ink jet printing thermal impact printing, and the like. A print media source 116, such as a paper tray, supplies paper or other print media to the marking engine for printing. A finisher 118, such as a paper tray, receives the print media from the marking engine 112 and may provide finishing capabilities such as collation, stapling, folding, stacking, hole-punching, binding, postage stamping, and the like. A conveyor system 120 conveys the print media between the source 116 and the marking engine 112 and between the marking engine and the finisher 118.

A sensor 122 senses reflectance of printed images (which can be correlated with gray levels) from which a print defect, such as one or more of banding, streaking, graininess, or mottle, where present, can be detected. The sensor 122 may be an on-line sensor and may be located between the marking engine 112 and the finisher 118, as shown, either in a direct path between the two or in a bypass path, and may be connected with an output catch tray 124. The sensor 122 may be a full width array sensor or other suitable sensor capable of detecting variations in reflectance across an image, such as a spectrophotometer. While the illustrated sensor is an on-line sensor, accessed by the conveyor system 120, it is also contemplated that the sensor may be an offline system, which may be coupled with the control system for transferring data therebetween. In the case of an offline sensor, an operator may carry printed sheets to the sensor 122 for analysis.

The illustrated marking engine 110 includes many of the hardware elements employed in the creation of desired images by electrophotographic processes. In the case of a xerographic device, the marking engine 110 typically includes a charge retentive surface, such as a rotating photoreceptor 130 in the form of a belt or drum. The images are created on a surface of the photoreceptor. Disposed at various points around the circumference of the photoreceptor 132 are xerographic subsystems which include, for each of the colors to be applied (one in the case of a monochrome printing system, four in the case of a CMYK printing system), a charging station 134, 136, 138, 140 such as a charging corotron, an exposure station 142 144, 146, 148, which forms a latent image on the photoreceptor, such as a Raster Output Scanner (ROS), and a developer unit 150, 152, 154, 156, associated with each charging station, for developing the latent image formed on the surface of the photoreceptor by applying a toner to obtain a toner image. A transferring unit, such as a transfer corotron 158 transfers the toner image thus formed to the surface of the print media sheet. A fuser 159 fuses the image to the sheet. The fuser generally applies at least one of heat and pressure to the sheet to physically attach the toner and optionally to provide a level of gloss to the printed media. In any particular embodiment of an electrophotographic marking engine, there may be variations on this general outline, such as additional corotrons, cleaning devices, and the like.

It will be appreciated that the marking engine is not limited to the specific arrangement of subsystems illustrated. For example, in another exemplary marking engine (not shown), each colorant is associated with its own photoreceptor and the image transferred between the photoreceptor and the print media by an intermediate transfer belt. In yet another embodiment, a single ROS and a single charging station are used and the print media is returned to the transfer point 158 multiple times.

The control system 112 may be embodied in a CPU or other processing device with associated memory for storing processing instructions. The control system communicates with the marking engine 112 or directly with actuators for the xerographic subsystems 130, 132, 134, 136, 138, 140, 142, 144, 146, 148, 150, 152, 154, 156, 158, 159 thereof for controlling the xerographic subsystems. While the control system 110 is illustrated as a single unit, it is to be appreciated that the control system may be distributed throughout the printing system 100, for example, located in the marking engine(s) or xerographic subsystems or elsewhere, such as in the workstations.

The control system 112 includes processing components. The processing components are illustrated herein as modules for convenience of illustrating the functions of the control system, although it is to be appreciated that two or more of the modules may be combined. The modules may include a raster image processing (RIP) module 160 for converting an input image into a form in which it can be rendered, a test patch module 162 for controlling the generation of a test patch, a defect analyzer 164 for determining print defects based on the sensed measurements from the sensor 122, and a screen/halftone parameter selector 166, all of which can be interconnected by a data/control bus 168. Although not illustrated, the control system 112 may include other components known in printing systems, such as a scheduling component for scheduling the order of printing of multiple jobs.

The test patch module 162 is capable of generating a test patch and sending it to the marking engine 112 for printing. The test patch may be a test image of uniform gray level over the entire image for a given color separation. When the test patch is printed, any print defects show up in the printed image as variations in the reflectance (i.e., gray level), for example, as streaks or bands having a higher or lower reflectance than the surrounding area.

The defect analyzer 164 analyses data from the sensor generated during sensing of the printed test patch and determines the defect state of the printing system. For example, for determining banding or streaking, the defect analyzer may use a fast Fourier transform analysis to detect peaks or troughs in gray level in the process or cross-process directions. The defect analyzer may determine a defect value which relates to the sensed defect, such as the distance between gray level peaks or troughs, or their frequency. For example, banding or streaking may be detected at a certain frequency.

The screen selector 166 may access an algorithm which, based on an input defect value or values, outputs an identifier of an appropriate screen. The screen may be defined by one or more selected halftone parameters which mask the detected defect from the range of selectable halftone parameters. Because some defects are more noticeable to the human observer than others, the defect value(s) determined by the defect analyzer and/or the screen selected by the screen selector may place a greater weight on the defects which are found in practice to be more objectionable to human observers.

The range of selectable halftone parameters for some print jobs may be limited by user constraints, which are communicated to the parameter selector in a file header associated with the image to be printed or may be input to the printing system via a user interface 172. For example, a minimum dpi may be preselected by a user or a specific dpi selected. This limits the range of screens from which the screen selector can make its selection to mask the defect. Where one parameter, such as screen frequency is constrained, the screen selector may use other parameters, such as the dot growth parameter or the screen angle to mask the defect.

The control system 110 controls the printing of the images in accordance with the selected screen halftone parameter(s). For example, a selected halftone screen for each color separation is utilized by the RIP module 160 in processing the input image.

The exemplary printing system may include more than one marking engine. For example the printing system may incorporate "tandem engine" printers, "parallel" printers, "cluster printing," "output merger," or "interposer" systems, and the like, as disclosed, for example, in U.S. Pat. Nos. 4,579,446; 4,587,532; 5,489,969 5,568,246; 5,570,172; 5,596,416; 5,995,721; 6,554,276, 6,654,136; 6,607,320, and in copending U.S. application Ser. No. 10/924,459, filed Aug. 23, 2004, for Parallel Printing Architecture Using Image Marking Engine Modules by Mandel, et al., and application Ser. No. 10/917,768, filed Aug. 13, 2004, for Parallel Printing Architecture Consisting of Containerized Image Marking Engines and Media feeder Modules, by Lofthus, the disclosures of all of these references being incorporated herein by reference. A parallel printing system typically feeds paper from a common paper stream to a plurality of marking engines, which may be horizontally and/or vertically stacked, whereas in a tandem engine printing system, two or more marking engines share a common paper path. A printing system may incorporate both parallel and tandem engine arrangements in the architecture. Printed media from the various marking engines is then taken from the marking engine to a finisher where the sheets associated with a single print job are assembled. A cluster printing system employs a common control system for distributing print jobs among a plurality of marking engines. However each marking engine may have its own conveyor system, print media source and finisher.

Figure 3:
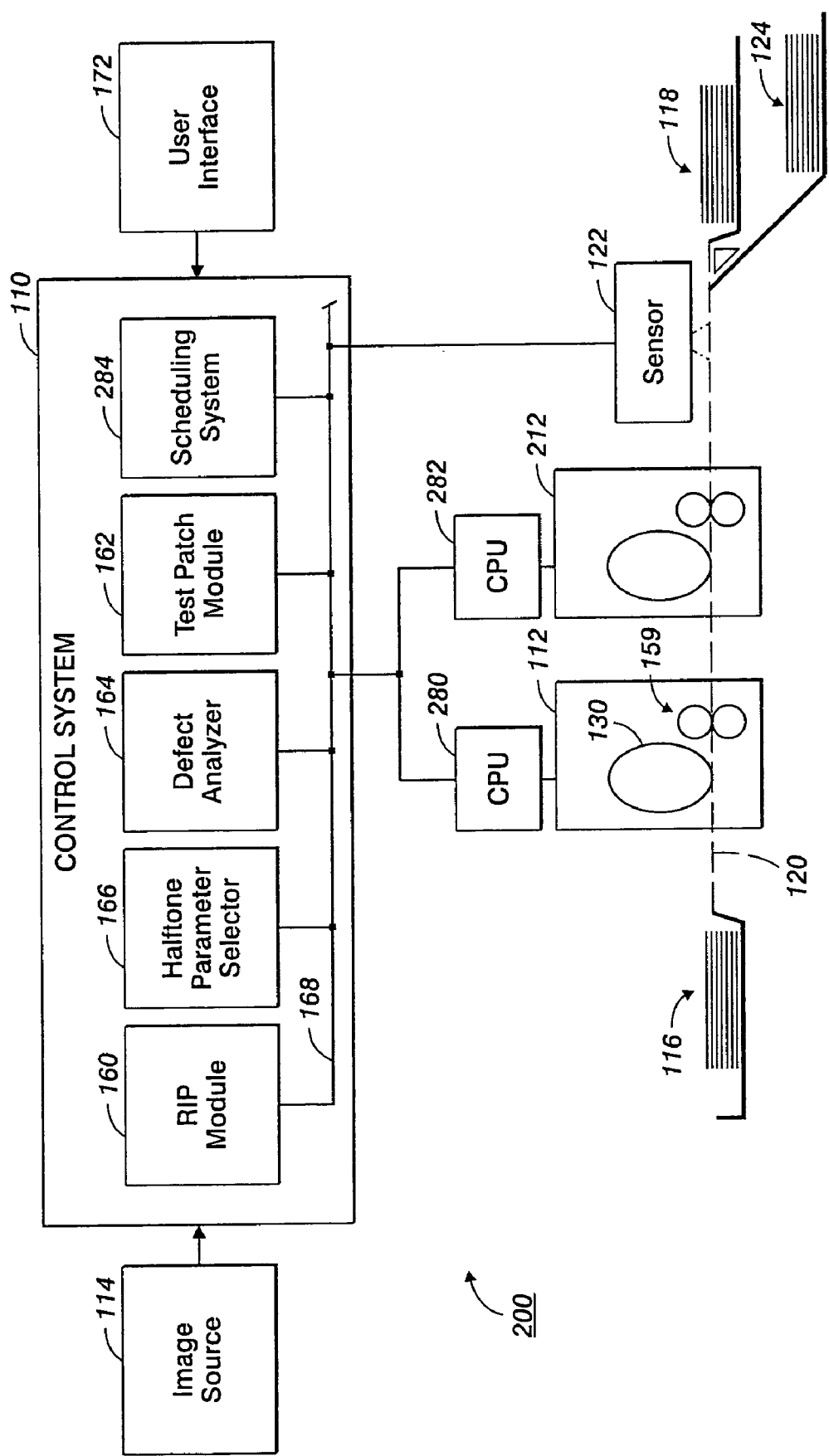
FIG. 3 is a schematic view of a printing system according to another aspect of the exemplary embodiment.

By way of example, FIG. 3 illustrates a printing system 200 which includes multiple marking engines in a tandem engine arrangement. The printing system 200 may be configured as for the printing system illustrated in FIG. 2, except as noted. Similar elements are accorded the same numerals with new elements accorded new numerals. The printing system of FIG. 3 includes two (or more) marking engines 112, 212. Marking engine 212 may be similarly configured to marking engine 112, e.g., nominally identical. However, over the course of time, the two marking engines may acquire different defect states such that marking engine 112 may have a first defect state and marking engine 212 a second defect state, different from the first defect state. The sensor 122 may measure the defect states of both marking engines in a similar manner to that described for the printing system of FIG. 2. Alternatively, each marking engine 112, 212 may have its own associated sensor for measuring the defect state of that marking engine. The defect analyzer 164 is able to distinguish between test patches printed by the first marking engine 112 and those printed by the second marking engine 212. The screen selector 166 may select a screen for each marking engine. Alternatively, the screen selector may be omitted. The control system 110 may be distributed in this embodiment, with each marking engine 112, 212 having its own control system, illustrated as a CPU 280, 282.

The printing system 200 includes a scheduling system 284 which schedules the printing of jobs that arrive at the printing system. Depending on the scheduling constraints for the scheduling system 284, a print job may be printed on marking engine 112, marking engine 212, or split between the two marking engines 112, 212. At those times where the print job(s) can be handled by one marking engine, the scheduling system may select a marking engine according to which marking engine provides the best print quality for the halftone screen utilized by the marking engine. The screen may be a preset screen or a screen selected to correct its detected defect state. Print quality may be determined for example, from one or more of the extent to which the defect state is corrected and the dpi of the screen being used in the marking engine.

In one embodiment, the defect analyzer 164 includes an algorithm which compares the defect states of the two or more marking engines according to criteria and outputs a defect value based on one or more detected defects. For example, the defect value generally increases as the determined defect state worsens. The scheduling system 284 may then select the marking engine which is determined to have the lowest defect value, i.e., the marking engine which has been determined to produce the fewest objectionable print defects.

Where both marking engines are required to be in operation at the same time, the scheduling system 284 may schedule those jobs where the print defect will be more noticeable or more objectionable on the marking engine which best masks the defect or which provides the highest dpi while masking the defect.

Scheduling systems are disclosed, for example, in U.S. Published Application Nos. 2004/0085561, 2004/0085567, and 2004/0088207 to Fromherz, published May 6, 2004, in copending U.S. application Ser. No. 11/137,251, and in U.S. Pat. No. 5,617,214 to Webster, et al., which are incorporated herein in their entireties by reference. Such a scheduling system may be used to schedule the print jobs herein, by introducing constraints for selection of a marking engine with fewer print defects.

Figure 4:
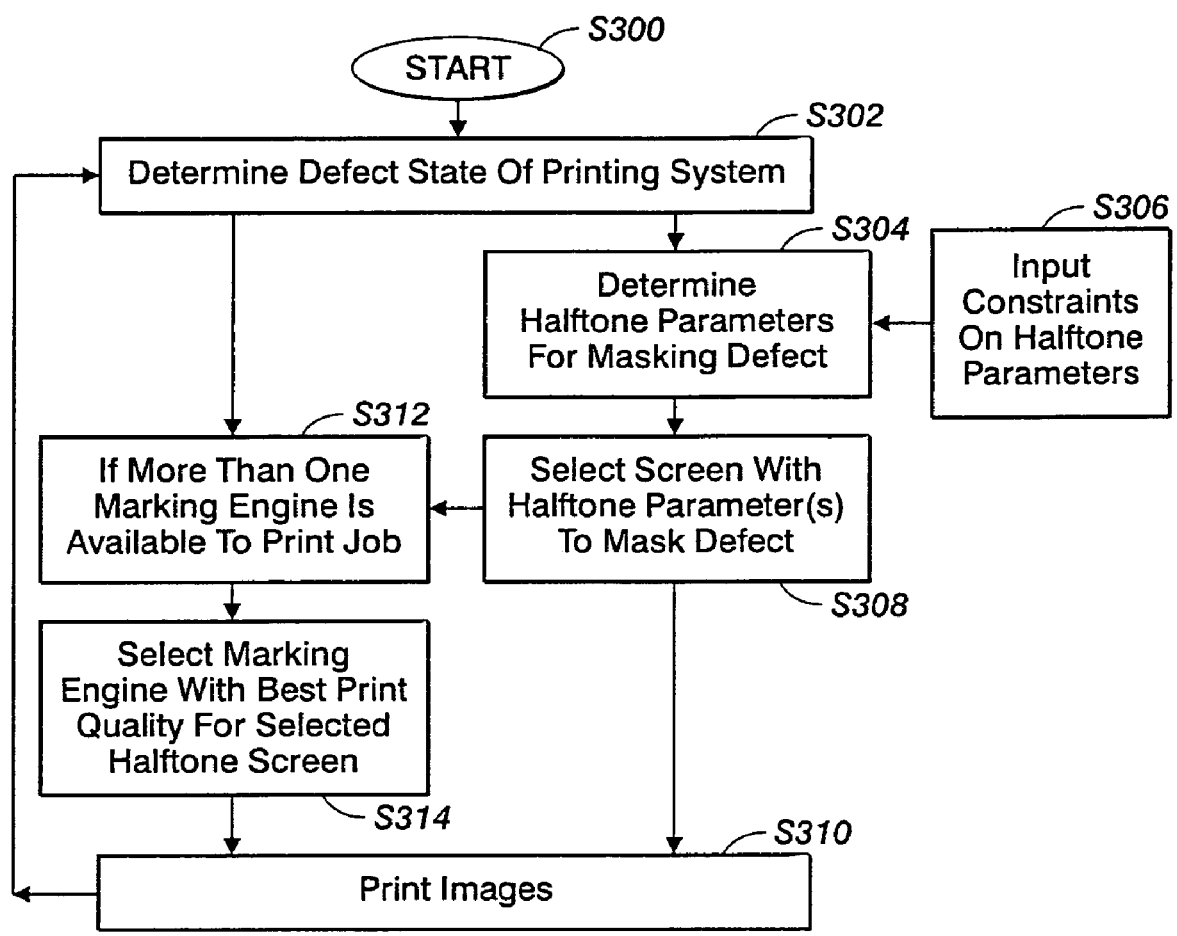
FIG. 4 illustrates an exemplary method for masking print defects in printing.

With reference now to FIG. 4, a method of printing which employs a printing system such as that of FIG. 2 or 3 is shown. It is to be appreciated that the method may include fewer or more steps than those illustrated and that the steps need not necessarily proceed in the order shown. The method begins at step S300. At step S302, the defect state of the printing system is determined. This may include, for each marking engine 112, 212 in the printing system, the substeps of: sending test patches (from the test patch module 162) to the marking engine (e.g., one uniform gray patch for each color separation) for printing on the print media; printing the test patches on the print media by the marking engine; sensing the printed test patches with the sensor 122; and analyzing the sensor data (with the defect analyzer 164) to determine the defect state of the marking engine. The printed test patches may be sent to the discard tray 124.

The test patches may be printed with the current halftone parameters of the printing system. In another embodiment, the halftone parameters used for printing the test patches are preset halftone parameters. In yet another embodiment, multiple test patches are printed, each one at a different selectable halftone parameter. The data can be used by the defect analyzer to determine parameter value(s) which best mask a print defect.

The analyzing substep may include applying image processing algorithms which extract print defects, such as banding, streaking, and the like, from the sensor data.

The determination of the defect state (step S302) may be performed repeatedly. In one aspect, the determination is performed periodically, e.g. at the start of each printing day The periodic measurement of the defect state may proceed automatically, without any need for operator input, particularly where an on-line sensor is available in the printing system. The frequency of the defect determination step may depend, to some degree, on how fast the defect state of the printer changes. Alternatively or additionally, the defect state may be determined intermittently, e.g., as selected by an operator. For example, the defect state may be measured prior to printing a large print job or prior to printing a print job where print quality is of particular importance or print defects are considered to be particularly objectionable.

At step S304, halftone parameters may be selected to mask the defect. For example, step S304 may include one or more of: selecting a screen frequency from a plurality of available screen frequencies; selecting a screen angle from a plurality of screen angles for at least one of the colors; and selecting a dot growth parameter from a plurality of available dot growth parameters. Optionally, at step S306 a user may set constraints on the parameters which may be selected. If so, the selecting of halftone parameters at step S304 is limited by the user constraints.

Step S304 may include inputting the detected defect state into an algorithm and outputting one or more appropriate halftone parameters.

At step S308, a screen which provides the halftone parameters is selected or designed which best matches the defect. Of course, if the halftone parameters of the screen currently being used by the printing system are best suited to masking the defect, no change in the screen may be needed.

Steps S304 and S308 may be combined into a single step in which the detected print defects are input into an algorithm which selects the appropriate screen.

At step S310, the printing system prints a print job using the selected screen/halftone parameter(s). This step may include RIPing an input image to be rendered with the selected screen, and sending the RIPed image to the marking engine for printing on the print media. The printed images are collected at the finisher 118.

Optionally, at step S312, if more than one marking engine is available for printing (e.g., the printing system has two or more marking engines 112, 212), the method may proceed to step S314, either before or after steps S304 and S308. At step S314, a marking engine is selected for printing an image based on the determined defect states of the marking engines. For example, the marking engine with the lowest defect state value (or highest print quality where both marking engines have the same defect state value) may be selected for printing. If more than one job is to be printed contemporaneously, in this step, the scheduling system 284 may select the marking engine with the lowest defect state value to print the job with the highest print quality requirements. For example, if one print job includes only text images while another includes graphical images, the scheduling system may schedule the print job with the graphical images on the marking engine with the lowest defect state value/highest print quality.

The method then proceeds to step S312 in which the print job is printed. This step may include RIPing an image to be printed and sending the RIPed image to the selected marking engine for printing.

The method may return to step S302 after a period of time. Thus, the steps of determining the print defect state and selecting the screen/marking engine are repeated, e.g., periodically or intermittently.

Even where two or more marking engines are available in a printing system, the method may nonetheless include the step of selecting halftone parameter(s) for each of the marking engines which mask the defect (step S304). Thus, the step of selecting a marking engine from a plurality of marking engines may include selecting a marking engine which has the best print quality. For example, if the parameters of one or both of the marking engines have been adjusted so that they have generally the same measured defect state (e.g., by adjusting the screen frequency of one or both marking engines), the marking engine with the highest print quality may be selected, which in the illustrated case may be the marking engine operating at the highest dpi.

The instructions for performing the method may be embodied as a computer program product, routine, or the like. The computer program product can be a computer readable medium, such as a disk, computer chip, or other electronic storage medium, having a computer readable program code thereon.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of printing comprising:
   determining a print defect state of a printing system, the determining of the print defect state comprising:
   printing at least one test patch;
   sensing gray level variations in the printed test patch; and
   determining periodic print defects based on the sensed gray level variations;
   where the determined print defect state includes a periodic print defect, selecting a screen from a plurality of screens, the selected screen having a halftone print parameter which has been determined to mask the determined periodic print defect, wherein the printing system comprises a plurality of marking engines and wherein:
   determining of the print defect state includes determining the print defect state of each of the plurality of marking engines; and the printing of images according to the selected halftone print parameter includes selecting a marking engine from the plurality of marking engines for printing of the images;
   and printing images according to the selected screen.

2. The method of claim 1, wherein the determining of the print defect state of a printing system and selecting of the screen which masks the print defect are repeated after the printing of images according to the selected screen.

3. The method of claim 2, wherein the determination of the print defect state and selecting of the screen are repeated at predetermined time intervals.

4. The method of claim 1, wherein the determination of the print defect state and selecting of the screen are performed automatically.

5. The method of claim 1, wherein the determination of the print defect state comprises determining non-uniformity of printed images.

6. The method of claim 1, wherein the sensing gray level variations includes sensing gray levels with an on-line sensor.

7. The method of claim 1, wherein the determining of the print defect state includes determining a frequency of a gray level variation.

8. The method of claim 1, wherein the print defect state is related to at least one of banding, streaking, graininess and mottle in printed images.

9. The method of claim 1, wherein the halftone print parameter comprises at least one of:
a screen frequency parameter;
a screen angle parameter; and
a dot growth parameter.

10. The method of claim 9, wherein the halftone print parameter comprises a screen frequency parameter and the method includes, for at least one colorant utilized by the printing system, selecting a screen from a plurality of screens with different screen frequencies.

11. The method of claim 9, wherein the halftone print parameter comprises a screen angle parameter and the method includes, for at least a first colorant, selecting a screen from a plurality of screens with different screen angles.

12. The method of claim 9, wherein the halftone print parameter comprises a dot growth parameter and the method includes, for at least a first colorant, selecting a screen from a plurality of screens with different dot growth.

13. A printing system comprising:
a plurality of marking engines;
a control system which, at intervals, determines a periodic print defect state of the printing system from periodic variations in gray level of a patch, when printed, of at least one test patch of uniform gray level and selects, from a plurality of screens, a screen with a halftone print parameter for masking the periodic print defect, the determining of the print defect state including determining the print defect state of each of the plurality of marking engines; and
a marking engine, selected from the plurality of marking engines, rendering images on print media, and rendering the images according to the selected screen to mask the periodic print defect.

14. The printing system of claim 13, further comprising a sensor in communication with the control system, which detects periodic print defects in printed media.

15. The printing system of claim 14, wherein the detected periodic print defect comprises banding.

16. The printing system of claim 14, wherein the sensor is an on-line sensor.

17. The printing system of claim 14, wherein the sensor detects gray level variations in printed images generated from test patches of uniform gray level.

18. The printing system of claim 13, wherein the printing system provides a plurality of selectable screens with different values of the halftone print parameter and the control system selects one of the selectable screens according to the determined periodic print defect state.

19. The printing system of claim 13, wherein the print defect state is related to at least one of banding, streaking, graininess and mottle in printed images.

20. The printing system of claim 13, wherein, wherein the halftone print parameter comprises at least one of:
a screen frequency parameter;
a screen angle parameter; and
a dot growth parameter.

21. A method of printing comprising:
determining a time-varying print defect state of each of a plurality of marking engines of a printing system, including:
printing at least one test patch of uniform gray level;
sensing gray level variations in the printed test patch; and
determining time-varying print defects based on the sensed gray level variations;
selecting a marking engine and one of a plurality of halftone screens for printing an image based on the determined print defect states to mask the determined time-varying print defects; and
printing the images on the selected marking engine.

* * * * *